(12) United States Patent
Maheshwari et al.

(10) Patent No.: US 11,090,893 B2
(45) Date of Patent: Aug. 17, 2021

(54) METHOD OF RECLAIMING A SEAL

(71) Applicant: Applied Materials, Inc., Santa Clara, CA (US)

(72) Inventors: Shagun P. Maheshwari, San Jose, CA (US); Yao-Hung Yang, Santa Clara, CA (US); Tom K. Cho, Los Altos, CA (US); Yu-Chi Yeh, Mountain View, CA (US); Andrew Yu, San Francisco, CA (US); Aniruddha Pal, San Jose, CA (US); Siamak Salimian, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 582 days.

(21) Appl. No.: 16/123,637

(22) Filed: Sep. 6, 2018

(65) Prior Publication Data

US 2020/0079044 A1    Mar. 12, 2020

(51) Int. Cl.
| | | |
|---|---|---|
| *F16J 15/328* | (2016.01) | |
| *B29D 99/00* | (2010.01) | |
| *F16J 15/3284* | (2016.01) | |
| *B29L 31/26* | (2006.01) | |
| *B29K 27/18* | (2006.01) | |

(52) U.S. Cl.
CPC ........ *B29D 99/0053* (2013.01); *F16J 15/328* (2013.01); *F16J 15/3284* (2013.01); *B29K 2027/18* (2013.01); *B29L 2031/265* (2013.01)

(58) Field of Classification Search
None
See application file for complete search history.

(56) References Cited

U.S. PATENT DOCUMENTS

| | | |
|---|---|---|
| 3,318,838 A | 5/1967 | Beverly |
| 5,658,509 A | 8/1997 | Sawyer et al. |
| 6,010,133 A | 1/2000 | Boyd et al. |

FOREIGN PATENT DOCUMENTS

| | | |
|---|---|---|
| JP | 2004019776 A | 1/2004 |
| JP | 2009167541 A | 7/2009 |
| TW | 201115499 A | 5/2011 |
| TW | 201629144 A | 8/2016 |

OTHER PUBLICATIONS

Taiwan Office Action dated Sep. 29, 2020 for Application No. 108128209.
"O-Ring Recovery After Use in Plasma Environments", Chemraz Elastometric PTFE, dated Jan. 7, 1994.
International Search Report and Written Opinion dated Oct. 31, 2019 for Application No. PCT/US2019/041813.
Taiwan Office Action dated Jun. 15, 2020 for Application No. 108128209.

*Primary Examiner* — Monica A Huson
*Assistant Examiner* — Kelsey C Grace
(74) *Attorney, Agent, or Firm* — Patterson + Sheridan, LLP (57) ABSTRACT

A method of reclaiming a used seal includes boiling the used seal in a liquid, and after boiling the used seal in the liquid, baking the used seal. The boiling the used seal may include boiling for a predetermined boiling time in the liquid, and the baking the used seal may include baking the used seal for a predetermined bake time at a predetermined temperature.

20 Claims, 5 Drawing Sheets

METHOD OF RECLAIMING A SEAL

BACKGROUND

Field

Aspects of the present disclosure generally relate to methods for reclaiming and reusing seals.

Description of the Related Art

In the current substrate manufacturing industry, seals, and in particular O-rings, consistently rank as one of the most consumed products used within processing chambers. These consumed seals must be regularly replaced to verify that the processing chambers remain functioning properly and safely. The replacement of the seals, however, is an expensive process, particularly for the multi-compound seals manufactured from multiple different materials or having certain characteristics or features for sealing at higher pressures and temperatures. The replacement of the seals, thus, adds to the overall cost per wafer manufactured and processed within the substrate manufacturing industry for instance.

Therefore, there exists a need for a process to reclaim seals for reuse to reduce manufacturing costs, particularly in the substrate manufacturing industry.

SUMMARY

In one aspect, the present disclosure relates to a method of reclaiming a used seal. The method includes boiling the used seal in a liquid, and after boiling the used seal in the liquid, baking the used seal.

In another aspect, the present disclosure relates to a method of reclaiming a used seal. The method includes removing the used seal from a sealing interface within a processing chamber after a predetermined amount of cycles, inspecting the used seal for a defect to determine if the used seal is reusable or non-reusable, and reclaiming the used seal if the used seal is determined to be reusable. The reclaiming the used seal includes boiling the used seal in a liquid, and baking the used seal after boiling. The method further includes re-inspecting the used seal for the defect after the reclaiming to determine if the used seal is reusable or non-reusable, treating the used seal using a predetermined treatment, and testing the used seal using a predetermined test to determine if the used seal is reusable or non-reusable based upon the predetermined test. The method includes positioning the used seal within another sealing interface after the testing if the used seal is determined to be reusable, and discarding the used seal if the used seal is determined to be non-reusable.

In yet another aspect, the present disclosure relates to a method of reclaiming a used O-ring. The method includes boiling the O-ring for a predetermined boil time in water, and baking the O-ring for a predetermined bake time at a predetermined temperature after the boiling.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of scope, as the disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

The present disclosure generally relates to one or more methods for reclaiming or reusing a used seal, such as an O-ring or a gasket. The method includes removing the seal from a sealing interface, inspecting the seal for defects, and then reclaiming the seal if the seal is reusable. The reclamation process includes boiling the seal, such as for a predetermined boiling time in a liquid, and baking the seal, such as for a predetermined baking time at a predetermined temperature. After reclaiming the seal, the seal is re-inspected to determine if the seal is reusable or non-reusable. If the seal is still determined to be reusable, the seal is treated and tested. Following the testing, the seal may be put into recirculation for reuse. Otherwise, at any point of the seal is determined to be non-reusable, the seal will be discarded.

Figure 1:
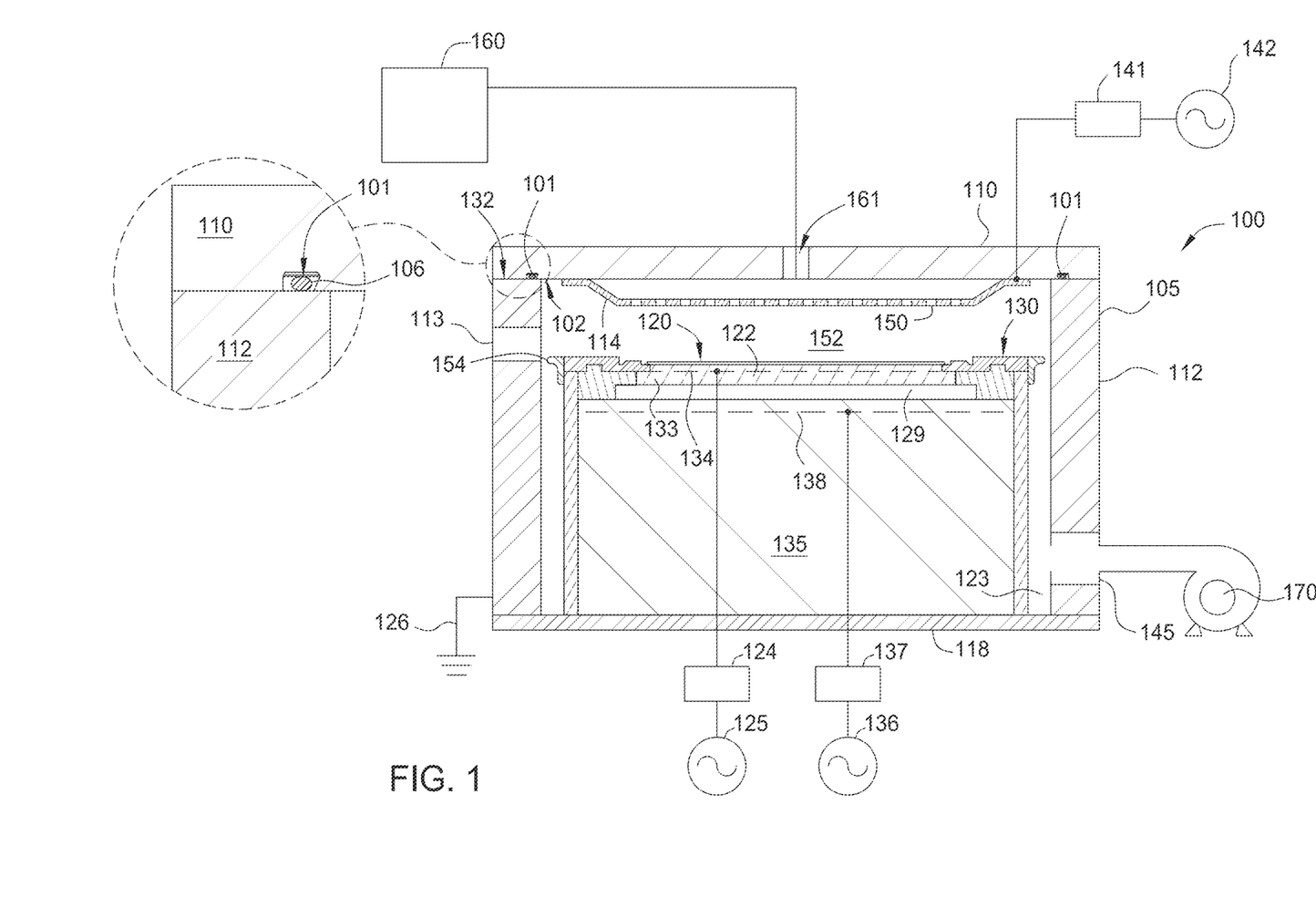
FIG. 1 is a cross sectional view of a processing chamber in accordance with one or more aspects of the present disclosure.

FIG. 1 is a cross-sectional view of a processing chamber 100 having a sealing groove 101 in accordance with one or more aspects of the present disclosure. As shown, the processing chamber 100 is an etch chamber suitable for etching or removing one or more material layers from a substrate, such as a substrate 120. Examples of processing chambers which benefit from aspects described herein are available from Applied Materials, Inc., located in Santa Clara, Calif., It is contemplated that other processing chambers, including those from other manufacturers, may be adapted to benefit from aspects of the disclosure, including a chemical vapor deposition (CVD) chamber, physical vapor deposition (PVD) chamber, etch chamber, annealing chamber, furnace, plasma treating chambers, transfer chambers, load lock chambers and implantation chambers, among others.

The vacuum processing chamber 100 includes a chamber body 105 enclosed by a chamber lid assembly 110 and defining a processing chamber volume 152 therein. The chamber body 105 has sidewalls 112 and a bottom 118 that may be coupled to a ground 126. The sidewalls 112 have a top surface 132. The dimensions of the chamber body 105 and related components of the vacuum processing chamber 100 are not limited and generally are proportionally larger than the size of the substrate 120 to be processed. Examples of substrate sizes include, among others, substrates 120 with a 150 mm diameter, 200 mm diameter, 300 mm diameter and 450 mm diameters, and the substrate 120 may have circular or non-circular shapes.

The chamber body 105 may be fabricated from aluminum or other suitable materials. A substrate access port 113 is formed through the sidewall 112 of the chamber body 105, facilitating the transfer of a substrate 120 into and out of the vacuum processing chamber 100. The access port 113 may be coupled to a transfer chamber and/or other chambers of a substrate processing system (both not shown). A gas source 160 provides process gases into the processing chamber volume 152 through an inlet 161 formed through the chamber body 105 or lid assembly 110. In one or more embodiments, process gases may include etchants and passivation gases.

A showerhead 114 may be coupled to the lid assembly 110. The showerhead 114 has a plurality of gas delivery holes 150 for distributing process gases entering the chamber volume 152 through the inlet 161. The showerhead 114 may be connected to an RF power source 142 through a match circuit 141. The RF power provided to the showerhead 114 energizes the process gases exiting the showerhead 114 to form plasma within the processing chamber volume 152.

A substrate support pedestal 135 is disposed below the showerhead 114 in the processing chamber volume 152. The substrate support pedestal 135 may include an electro-static chuck (ESC) 122 for holding the substrate 120 during processing. The ring assembly 130 is disposed on the ESC 122 and along the periphery of the substrate support pedestal 135. The ring assembly 130 controls the distribution of etching gas radicals at the edge of the substrate 120, while shielding the top surface of the substrate support pedestal 135 from the plasma environment inside the vacuum processing chamber 100.

The ESC 122 is powered by an RF power source 125 integrated with a match circuit 124. The ESC 122 comprises an electrode 134 embedded within a dielectric body 133. The RF power source 125 may provide a RF chucking voltage of about 200 volts to about 2000 volts to the electrode 134. The RF power source 125 may also be coupled to a system controller for controlling the operation of the electrode 134 by directing a DC current to the electrode for chucking and de-chucking the substrate 120.

A cooling base 129 is provided to protect the substrate support pedestal 135 and assists in controlling the temperature of the substrate 120. The cooling base 129 and ESC 122 work together to maintain the substrate temperature within the temperature range required by the thermal budget of the device being fabricated on the substrate 120. The ESC 122 may include heaters for heating the substrate, while the cooling base 129 may include conduits for circulating a heat transfer fluid to sinking heat from the ESC 122 and substrate disposed thereon. For example, the ESC 122 and cooling base 129 may be configured to maintain the substrate 120 at a temperature of about minus 25 degrees Celsius to about 100 degrees Celsius for certain embodiments, at a temperature of about 100 degrees Celsius to about 200 degrees Celsius temperature range for other embodiments, and at about 200 degrees Celsius to about 500 degrees Celsius for yet still other embodiments. In one embodiment, the substrate 120 temperature is maintained at 15 to 40 degrees Celsius by the ESC 122 and cooling base 129.

Lift pins (not shown) are selectively moved through the substrate support pedestal 135 to lift the substrate 120 above the substrate support pedestal 135 to facilitate access to the substrate 120 by a transfer robot or other suitable transfer mechanism. A cathode electrode 138 is disposed in the substrate support pedestal 135 and connected to an RF power source 136 through an integrated match circuit 137. The cathode electrode 138 capacitively couples power to the plasma from below the substrate 120. In one embodiment, the RF power source 136 provides the cathode electrode 138 with between about 200 W to about 1000 W of RF power.

A pumping port 145 may be formed through the sidewall 112 of the chamber body 105 and connected to the chamber volume through the exhaust manifold 123. A pumping device 170 is coupled to the processing chamber volume 152 through the pumping port 145 to evacuate and control the pressure therein. The exhaust manifold 123 has a baffle plate 154 to control the uniformity of the plasma gas drawn into the exhaust manifold 123 from the pumping device 170. The pumping device 170 may include one or more pumps and throttle valves. The pumping device 170 and chamber cooling design enables high base vacuum (about $1 \times E^{-8}$ Torr or less) and low rate-of-rise (about 1,000 mTorr/min) at temperatures suited to thermal budget needs, e.g., about −25 degrees Celsius to about +500 degrees Celsius. In one embodiment, the pumping device enables a vacuum pressure between 10 and 30 mT.

During processing, gas is introduced into the vacuum processing chamber 100 to form a plasma and etch the surface of the substrate 120. The substrate support pedestal 135 is biased by the power source 136. Power source 142 energizes the process gas, supplied by the gas source 160, leaving the showerhead 114 to form the plasma. Ions from the plasma are attracted to the cathode in the substrate support pedestal 135 and bombard/etch the substrate 120 until a desired structure is formed.

The lid assembly 110 is moveable between an open position and a closed position to facilitate service to the interior of the vacuum processing chamber 100. One of the lid assembly 110 and the chamber body 105 includes one or more sealing grooves 101. The sealing groove 101, shown formed in a bottom surface 102 of the lid assembly 110, has a seal 106 disposed therein. The seal 106 may be an O-ring, a gasket, or any other suitable seal, the material of which is selected for the expected process conditions. For example, the seal 106 may include one or more elastomeric materials, such as polytetrafluoroethylene (PTFE), rubber, silicone, perfluoroelastomer (FFKM), fluoroelastomer (FKM), and/or other polymers. Other types of seals, such as bonds or packings, are also contemplated.

When the lid assembly 110 is in the open position, a portion of the seal 106 extends below the bottom surface 102 of the lid assembly 110. When the lid assembly 110 is moved into the closed position, the seal 106 is compressed between the top surface 132 of the chamber body 105 and the lid assembly 110, thereby sealing the lid assembly 110 to the chamber body 105. The compression of the seal 106 is sufficient to prevent the flow of gas from outside the chamber body 105 from entering the processing chamber volume 152 when vacuum conditions are present within the chamber volume 152. The processing parameters utilized to etch a particular material disposed on the substrate 120 may be used to dictate the selection of the material and geometry for the seal 106. The seal 106 may thermally expand and contract without extruding from the sealing groove 101 while maintaining 10 mTorr to about 30 mTorr of pressure at about 40 degrees Celsius or greater. The seal 106 also allows a wider window for plasma processes that prevent contamination associated with seal failure.

Figure 2:
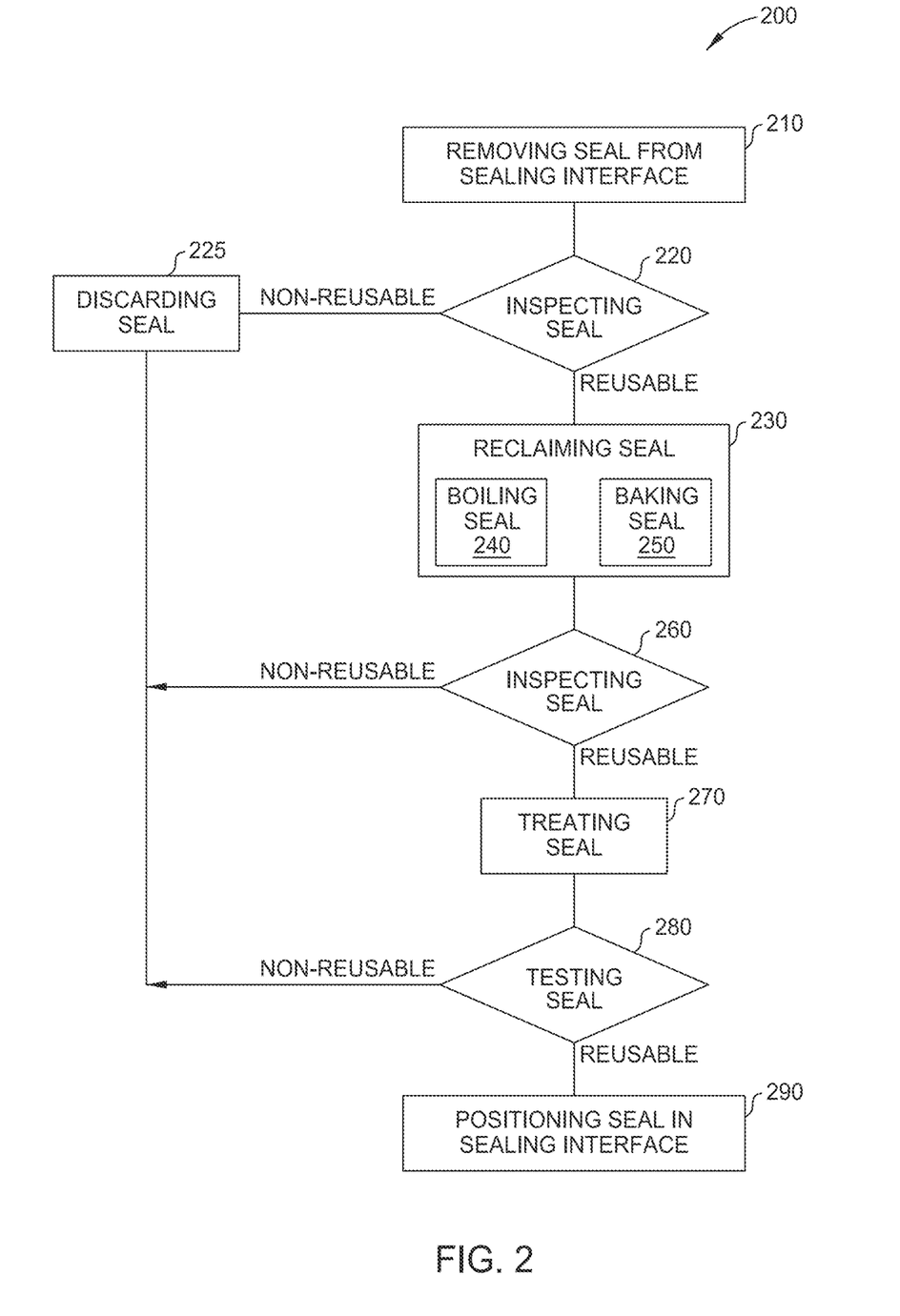
FIG. 2 is a flowchart of a method of reclaiming or reusing a seal in accordance with one or more embodiments of the present disclosure.

Referring now to FIG. 2, a flowchart of a method 200 of reclaiming or reusing a used seal, such as an O-ring, a gasket, or any other type of seal, in accordance with one or more embodiments of the present disclosure is shown. The method 200 includes removing the seal from a sealing interface in operation 210. In operation 210, the seal is removed from a sealing interface, such as from use within a processing chamber, after a predetermined amount of cycles. For example, FIG. 1 shows the seal 106 forming a sealing interface within the sealing groove 101 between the lid assembly 110 and the sidewall 112 of the chamber body 105. For safety and quality reasons, the seal 106 may be removed from use within the sealing groove 101 based upon a predetermined amount of cycles, such as based upon a predetermined amount of pressure cycles of the processing chamber 100 or a predetermined amount of substrates 120 processed within the processing chamber 100. However, instead of the automatically discarding the seal 106 after use, the seal 106 may be reclaimed for reuse within the processing chamber 100, another processing chamber, or even another sealing interface application.

After removing the seal from a sealing interface in operation 210, the method 200 proceeds with inspecting the seal in operation 220. In operation 220, the seal is inspected for one or more defects to determine if the seal is reusable or non-reusable, and thus is a candidate for reclamation. An example of a defect that the seal is inspected for includes the seal not having a uniform thickness, such as from the seal being cut, pinched, or eroded in one or more areas. The seal may be inspected macroscopically, such as through visual inspection from a qualified or educated individual with respect to the substrate manufacturing industry. The seal may additionally or alternatively be inspected microscopically, such as by inspecting the seal under a scanning electron microscope.

The seal may be determined to be reusable or non-usable based upon the inspection in operation 220. For example, if one or more defects are detected during inspection in operation 220, the seal may be determined to be non-reusable, and if no defects are detected during inspection in operation 220, the seal may be determined to be reusable. If the seal is determined to be non-reusable, the method 200 may proceed to discarding the seal in operation 225 such that the seal may not be reused later within a sealing interface. If the seal is determined to be reusable, the method 200 may proceed to reclaiming the seal in operation 230.

In operation 230, the seal may be reclaimed by boiling the seal in operation 240 and/or baking the seal in operation 250. Operation 240 involves boiling the seal for a predetermined boiling time in a liquid. For example, the predetermined boiling time may be about 15 minutes, about 30 minutes, about 45 minutes, about 60 minutes, about 90 minutes, about 120 minutes, about 150 minutes, or any predetermined bake time therebetween. In another embodiment, the predetermined boiling time may be only about 15 minutes, only about 30 minutes, only about 45 minutes, only about 60 minutes, only about 90 minutes, only about 120 minutes, or only about 150 minutes. Further, the liquid for boiling the seal may be or include a solvent, such as water, and more particularly deionized water. The boiling may occur while the liquid is at a pressure that is greater than standard atmospheric pressure (>1 atm). For example, the liquid may be boiled within a pressurized vessel.

Operation 250 involves baking the seal for a predetermined bake time at a predetermined temperature. For example, the predetermined bake time may be about 15 minutes, about 30 minutes, about 45 minutes, about 60 minutes, about 90 minutes, about 90 minutes, about 120 minutes, about 150 minutes, or any predetermined bake time therebetween. In another embodiment, the predetermined bake time may be only about 15 minutes, only about 30 minutes, only about 45 minutes, only about 60 minutes, only about 90 minutes, only about 120 minutes, or only about 150 minutes. The predetermined temperature for baking may be about 75° C., about 100° C., about 75° C., about 150° C., about 175° C., about 200° C., about 225° C., or any predetermined temperature therebetween. In another embodiment, the predetermined temperature for baking may be only about 75° C., only about 100° C., only about 75° C., only about 150° C., only about 175° C., only about 200° C., or only about 225° C.

The boiling the seal in operation 240 and the baking the seal in operation 250 may be performed in either order, in that the seal may be boiled first in operation 240 before being baked in operation 250, or the seal may be baked first in operation 250 before being boiled in operation 240. For example, in one embodiment, the seal may be boiled in liquid in operation 240 to reduce surface hardness of the seal. Then the seal may be baked in operation 250 to remove water from the seal, which prevents unwanted contamination when the seal is later placed into the process chamber. Baking the seal also restores the proper shape of the seal.

Referring still to FIG. 2, the method 200 further includes inspecting the seal in operation 260, such as for re-inspecting the seal. In operation 260, the seal may be re-inspected for one or more defects after the seal has been reclaimed in operation 230 to determine if the seal is reusable or non-reusable. The seal may be inspected for defects similar to those identified above (e.g., seal not having a uniform thickness), particularly if operation 230 is not performed earlier. Further, the seal may be inspected for other defects not inspected for in operation 230. For example, in operation 260, the seal may be re-inspected such that the seal is capable of forming a sealing interface, in that the elasticity and other performance characteristics of the seal have been reclaimed.

Figure 3:
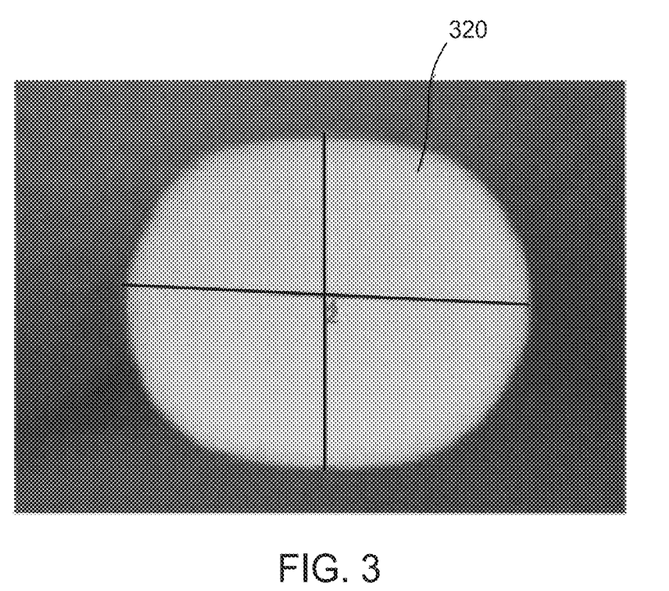
FIG. 3 is a cross-sectional view of an O-ring before reclamation in accordance with one or more embodiments of the present disclosure.
Figure 4:
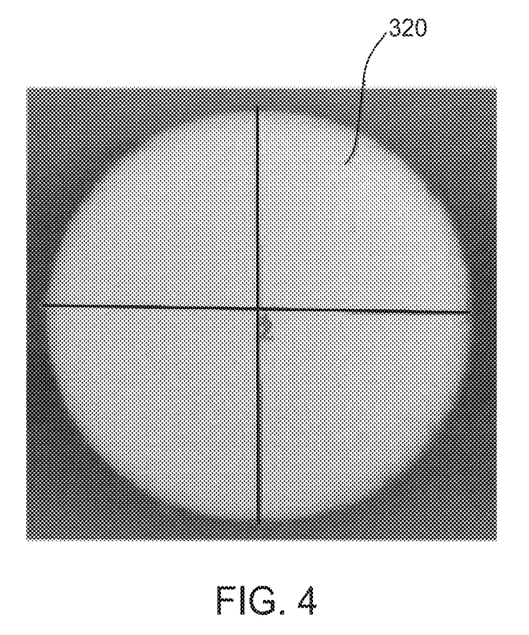
FIG. 4 is a cross-sectional view of an O-ring before reclamation in accordance with one or more embodiments of the present disclosure.

In one embodiment, the seal may be inspected in operation 260 to determine if the seal has a substantially consistent cross-section. For example, the seal may be inspected to determine if the seal has a substantially consistent circular cross-section, such as if the seal was originally manufactured with a circular cross-section. FIG. 3 shows a cross-section of an O-ring 320 before the reclaiming in operation 230, and FIG. 4 shows a cross-section of the O-ring 320 after the reclaiming in operation 230. As shown in FIG. 3, the cross-section of the O-ring 320 in FIG. 3 before reclamation is not substantially circular, whereas the cross-section of the O-ring 320 in FIG. 4 after reclamation is substantially circular. Thus, the reclamation of the O-ring in operation 230 was successful, in that the O-ring 320 may be reusable. In such an embodiment, the inspecting the O-ring 320 in operation 260 may involve comparing the cross-sectional diameter of the O-ring 320 with a predetermined cross-sectional diameter. If the cross-sectional diameter of the O-ring 320 after reclamation in operation 230 is not within a predetermined range (e.g., about 3 percent or about 5 percent) of the original manufactured cross-sectional diameter of the O-ring 320, the O-ring 320 may be determined to be defective and non-reusable. Thus, if non-reusable, the O-ring 320 may be discarded in operation 225. If the O-ring 320 has a cross-sectional diameter after reclamation in operation 230 that is within the predetermined range of the original manufactured cross-sectional diameter of the O-ring 320, the O-ring 320 may be determined to be operational and reusable.

In embodiments in which the seal does not have a circular cross-section and includes another shaped cross-section (e.g., rectangular or rounded rectangular cross-section), operation 260 may include having the cross-section of the seal compared with one or more dimensions of the original manufactured cross-section of the seal. Similarly, if the dimensions of cross-section of the seal after reclamation in operation 230 are not within a predetermined range (e.g., about 3 percent or about 5 percent) of the original manufactured cross-sectional dimensions of the seal, the seal may be determined to be defective and non-reusable. Otherwise, if the dimensions of cross-section of the seal after reclamation in operation 230 are within the predetermined range of the original manufactured cross-sectional dimensions of the seal, the seal may be determined to be operational and reusable.

The method 200 further includes treating the seal in operation 270. Operation 270 involves using one or more predetermined treatments to treat the seal, such as that the seal does not become a source of contamination. A predetermined treatment may include using a cleaning treatment, a plasma treatment, and/or an ozone treatment to treat the seal. For example, the cleaning treatment may involve treating the seal with a cleaning solution that includes deionized water or isopropyl alcohol, such as by wiping or otherwise exposing the seal to the cleaning solution. The plasma treatment may involve exposing the seal to plasma, such as oxygen plasma or another gas to generate the plasma. The ozone treatment may then involve exposing the seal to ozone.

The treatment of the seal in operation 270 may be performed on multiple occasions, such as after one or more of the above or below identified operations. For example, the seal may additionally or alternatively be treated in operation 270 after removing the seal in operation 210 and/or inspecting the seal in operation 220 before reclaiming the seal in operation 230.

The method 200 further includes testing the seal in operation 280. The seal is tested in operation 280 using one or more predetermined tests to determine if the seal is still reusable or is non-reusable. For example, the seal may be tested using a pressure test to determine if the seal has a leak rate above a predetermined amount after a predetermined amount of time. In one embodiment, if the seal has a leak rate above about 2 mTorr (about 0.27 Pascals) per minute, such as after about one hundred seconds, about two hundred seconds, or about three hundred seconds, then the seal may be determined to be non-reusable based upon the pressure test. Additionally or alternatively, the seal may be tested using a particle test to determine if the seal is capable of preventing a predetermined amount of particles past the seal when under sealing conditions. Furthermore, the seal may be tested to determine if the seal has one or more contaminants, such as trace metals, such that the seal is a source of contamination.

In operation 280, based upon the one or more of the tests identified above, or even one or more other tests not identified, the seal may be determined to be reusable or non-reusable. If the seal is non-reusable, the seal may be discarded in operation 225. If the seal is reusable, the method 200 may proceed to reusing the seal, such as by positioning the seal within a sealing interface in operation 290. The seal may be reused in operation 290 by being positioned within the same processing chamber or another processing chamber, or may be reused by being positioned within another sealing interface application not within a processing chamber.

A method in accordance with the present disclosure may not need to include one or more of the operations identified above in FIG. 2, or may include one or more operations not identified with respect to FIG. 2. Further, one or more operations in FIG. 2 may be rearranged or preformed in a different sequence. Thus, the present disclosure contemplates other methods and embodiments than those identified only in FIG. 2.

Figure 5:
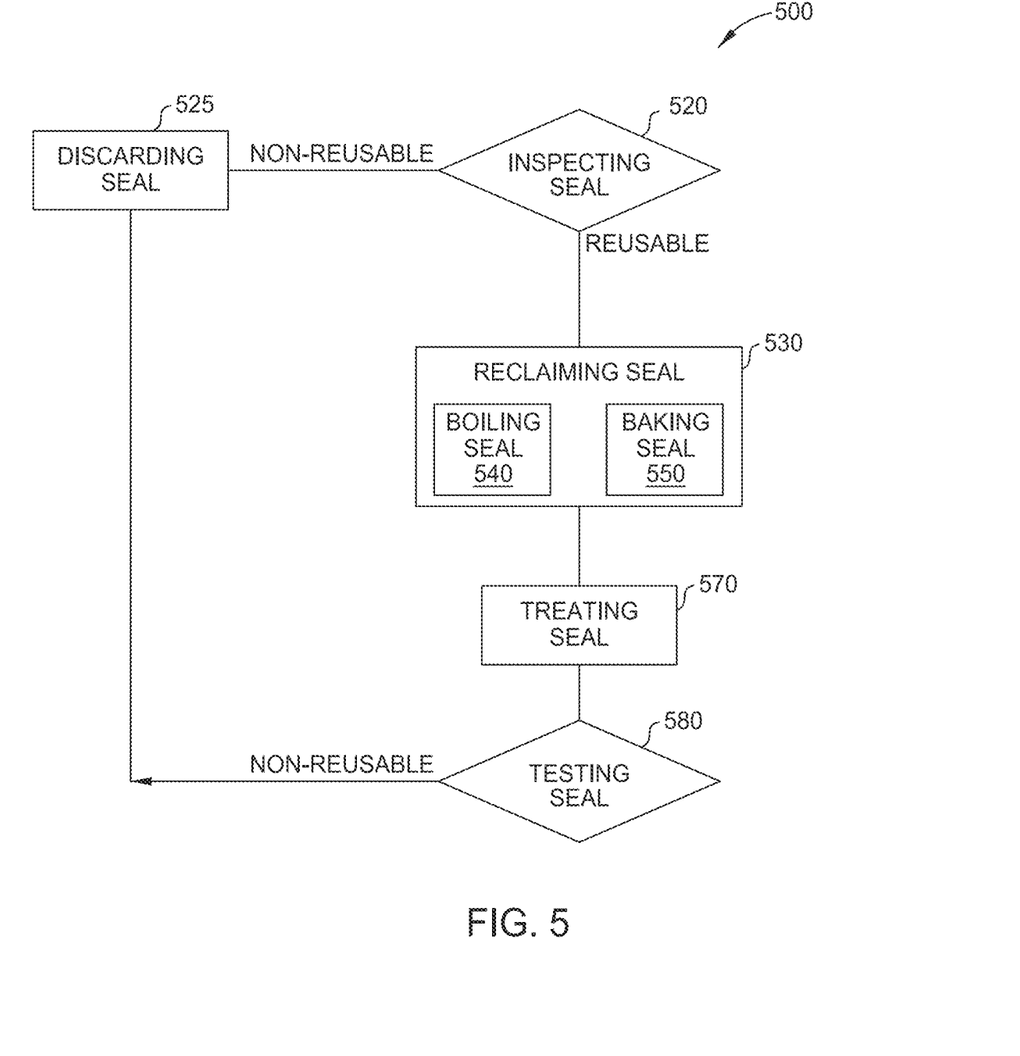
FIG. 5 is a flowchart of a method of reclaiming or reusing a seal in accordance with one or more embodiments of the present disclosure.

For example, FIG. 5 is a flowchart of a method 500 of reclaiming or reusing a used seal in accordance with one or more embodiments of the present disclosure. The method 500 includes inspecting the seal for one or more defects in operation 520 to determine if the seal is reusable or non-reusable based upon the defects. If the seal is non-reusable, the seal is discarded in operation 525. If the seal is reusable, the method 500 includes reclaiming the seal in operation 530. The reclaiming of the seal in operation 530 includes boiling the seal in operation 540 and/or baking the seal 550. The method 500 further includes treating the seal in operation 570 and testing the seal in operation 580.

Figure 6:
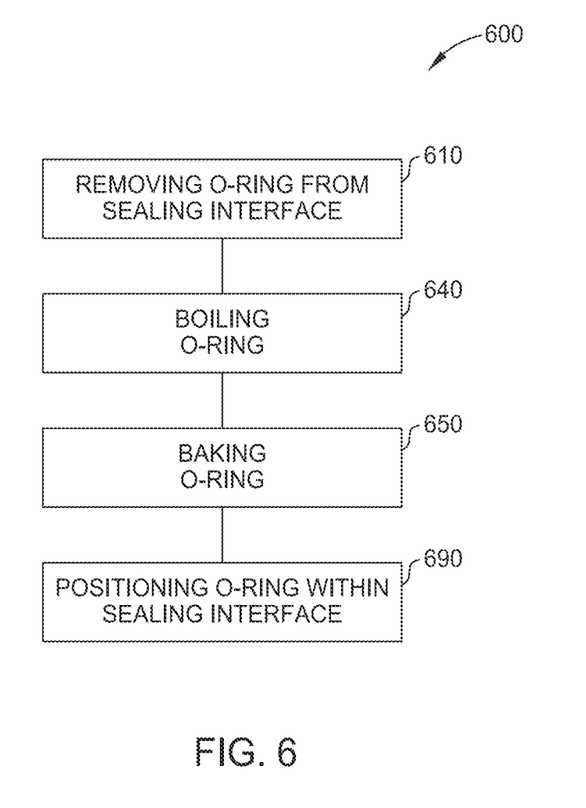
FIG. 6 is a flowchart of a method of reclaiming or reusing an O-ring in accordance with one or more embodiments of the present disclosure.

Further, FIG. 6 is a flowchart of a method 600 of reclaiming or reusing a used O-ring in accordance with one or more embodiments of the present disclosure is shown. The method 600 includes removing the O-ring from a sealing interface in operation 610, boiling the O-ring in operation 640, and baking the O-ring in operation 650. The O-ring may then be reused by being positioned within another sealing interface in operation 690. Thus, a method in accordance with the present disclosure may include variances on the operations shown and discussed above with respect to FIG. 2.

As discussed above, a method in accordance with the present disclosure may be used to reclaim and reuse seals, and in particular O-rings. The reclamation and reuse of seals, such as within processing chambers used within the substrate manufacturing industry, may reduce the cost per wafer by up to about five percent or more, thus reducing economic waste. Further, the reclamation and recovery process for the seals may account for and reduce the residual hardness of the seals for an improved reclamation lifespan.

As used herein, the term "about" encompasses +/−5% of each numerical value. For example, if the numerical value is "about 80%," then it can be 80%+/−5%, equivalent to 76% to 84%. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While the foregoing is directed to aspects of the present disclosure, other and further aspects of the disclosure may be devised without departing from the basic scope thereof, and the scope thereof is determined by the claims that follow.

What is claimed is:

1. A method of reclaiming a used seal, comprising:
   boiling the used seal in a liquid; and
   after boiling the used seal in the liquid, baking the used seal.

2. The method of claim 1, wherein the used seal comprises an O-ring or a gasket.

3. The method of claim 1, wherein the liquid comprises deionized water, wherein the boiling comprises boiling the used seal for at least a predetermined boiling time, and wherein the predetermined boiling time is between about 15 minutes and about 150 minutes.

4. The method of claim 3, wherein the predetermined boiling time is about 120 minutes.

5. The method of claim 1, wherein the baking comprises baking the used seal for at least a predetermined bake time at at least a predetermined temperature, wherein the predetermined bake time is between about 15 minutes and about 90 minutes, and wherein the predetermined temperature for baking is between about 125° C. and about 225° C.

6. The method of claim 5, wherein the predetermined bake time is about 30 minutes and the predetermined temperature for baking is about 150° C.

7. The method of claim 1, further comprising:
inspecting the used seal for a defect to determine if the used seal is reusable or non-reusable based upon the defect;
reclaiming the used seal if the used seal is determined to be reusable, wherein the reclaiming comprises the baking and the boiling;
treating the used seal using a predetermined treatment; and
testing the used seal using a predetermined test to determine if the used seal is reusable or non-reusable based upon the predetermined test.

8. The method of claim 7, wherein the predetermined treatment comprises a cleaning treatment, a plasma treatment, or an ozone treatment.

9. The method of claim 8, wherein the cleaning treatment comprises treating the used seal with deionized water or isopropyl alcohol.

10. The method of claim 7; further comprising removing the used seal from a sealing interface within a processing chamber after a predetermined amount of cycles.

11. The method of claim 7, wherein the inspecting the used seal for the defect comprises macroscopically or microscopically inspecting the used seal for the defect, wherein the defect comprises at least one of the used seal being pinched, the used seal being cut, or the used seal being eroded.

12. The method of claim 7, further comprising re-inspecting the used seal for the defect after the reclaiming the used seal to determine if the used seal is reusable or non-reusable based upon the defect.

13. The method of claim 12, further comprising determining the used seal is non-reusable if the used seal does not have a measured circular cross-section within a predetermined range of an original cross-sectional diameter of the used seal.

14. The method of claim 7, wherein the predetermined test comprises a particle test or a pressure test.

15. The method of claim 1, wherein the used seal is boiled in the liquid while the liquid is at a pressure higher than standard atmospheric pressure.

16. A method of reclaiming a used seal, comprising:
removing the used seal from a sealing interface within a processing chamber after a predetermined amount of cycles;
inspecting the used seal for a defect to determine if the used seal is reusable or non-reusable;
reclaiming the used seal if the used seal is determined to be reusable, wherein the reclaiming comprises;
boiling the used seal in a liquid; and
baking the used seal after the boiling; and
re-inspecting the used seal for the defect after the reclaiming to determine if the used seal is reusable or non-reusable;
treating the used seal using a predetermined treatment;
testing the used seal using a predetermined test to determine if the used seal is reusable or non-reusable based upon the predetermined test; and
positioning the used seal within another sealing interface after the testing if the used seal is determined to be reusable.

17. The method of claim 16, wherein the boiling comprises boiling the used seal for a predetermined boiling time in the liquid, wherein the liquid comprises a solvent and the predetermined boiling time is about 30 minutes, wherein the baking comprises baking the used seal for at least a predetermined bake time at at least a predetermined temperature, and wherein the predetermined bake time is about 30 minutes and the predetermined temperature for baking is about 150° C.

18. A method of reclaiming a used O-ring, comprising:
boiling the used O-ring for a predetermined boil time in water; and
baking the used O-ring for a predetermined bake time at a predetermined temperature after the boiling.

19. The method of claim 18, further comprising treating the used O-ring using a predetermined treatment.

20. The method of claim 18, further comprising testing the used O-ring using a predetermined test to determine if the used O-ring is reusable or non-reusable based upon the predetermined test.

* * * * *